United States Patent [19]

Shutterly

[11] Patent Number: 4,654,889

[45] Date of Patent: Mar. 31, 1987

[54] MULTI-STAR FIBER OPTIC NETWORK WITH IMPROVED ACCESS TIME

[75] Inventor: Harold B. Shutterly, Edgewood Boro, Pa.

[73] Assignee: Westinghouse Electric Corp., Pittsburgh, Pa.

[21] Appl. No.: 698,332

[22] Filed: Feb. 5, 1985

[51] Int. Cl.[4] .............................. H04B 9/00
[52] U.S. Cl. ..................... 455/601; 370/89; 455/607; 455/612
[58] Field of Search ............ 455/601, 606, 607, 612; 370/86, 87, 88, 89

[56] References Cited

U.S. PATENT DOCUMENTS

| | | | |
|---|---|---|---|
| 4,027,153 | 5/1977 | Käch | 455/607 |
| 4,366,565 | 12/1982 | Herskowitz | 370/1 |
| 4,457,581 | 7/1984 | Johnson et al. | 455/612 |
| 4,503,533 | 3/1985 | Tobagi et al. | 370/89 |

FOREIGN PATENT DOCUMENTS

| | | | |
|---|---|---|---|
| 55-123248 | 9/1980 | Japan | 455/612 |
| 58-79347 | 5/1983 | Japan | 455/607 |

Primary Examiner—Joseph A. Orsino, Jr.
Attorney, Agent, or Firm—Daniel C. Abeles

[57] ABSTRACT

A multi-star fiber optic network achieves improved access periods by grouping terminal devices into subnetworks that are connected to a bus, with token passing or collision detection being localized to individual subnetworks and with communication between subnetworks being conducted over the bus via non-interfering optical channels. The optical channels may be obtained by using light sources having different wavelengths or by modulating light at different channel frequencies. Each subnetwork includes an N-to-1 star which receives optical signals from terminal devices in the subnetwork and 1-to-N star which distributes optical signals to terminal devices in the subnetwork. Each subnetwork also includes a transmit repeater connected between the N-to-1 star and the bus to transmit messages which are addressed to other subnetworks on a unique channel, and a receive repeater connected between the bus and the 1-to-N star to receive messages on the channels assigned to other subnetworks. An electrical signal path connects the transmit repeater of a subnetwork with the receive repeater thereof to provide a signal path which does not utilize the bus. A buffer memory within the receive repeater of each subnetwork temporarily stores messages for subsequent distribution within the subnetwork. In order to avoid overloading any particular subnetwork when a token passing protocol is employed, for example, other subnetworks temporarily delay passage of the token when an outgoing message is generated. During this temporary delay messages stored in the buffer of the receive repeater are distributed.

15 Claims, 15 Drawing Figures

MULTI-STAR FIBER OPTIC NETWORK WITH IMPROVED ACCESS TIME

BACKGROUND OF THE INVENTION

The present invention is directed to an optical communication network, and more particularly to a fiber optic network wherein terminal devices are grouped into subnetworks that are connected to a fiber bus in a manner which permits token passing or message collision detection to be localized to the subnetworks, with communication between subnetworks being achieved over the bus via non-interfering channels. The result is a significant reduction in network access time, which becomes independent of the bus length. Both the maximum and average access times are improved.

Continuing improvements in the quality of optical fibers, and in particular reduced attenuation rates, have made optical fiber communication networks an increasingly attractive alternative to networks which employ conductors as the transmission medium. In order to communicate optically, an electrical signal developed within a transmitting terminal device, such as, for example, a telephone, computer, or numerically controlled machine tool, is delivered to an optical transmitter within the terminal device. The optical transmitter uses the electrical signal to modulate light from a source such as an LED or a laser. The modulated light is then transmitted, by optical fibers and splicing devices such as stars and access couplers, to an optical receiver within a receiving terminal device. The optical receiver includes an optical detector, such as a photodiode, which re-converts the modulated optical signal into an electrical signal. Thus the optical transmitters and receivers within the terminal devices, in addition to the optical fibers and other components connecting them, effectively replace conductors which might otherwise have been used. Although optical fibers, like conductors, can convey information in either analog or digital form, the high bandwidth of fibers makes them particularly useful for conveying digital data in serial form.

Figure 1:
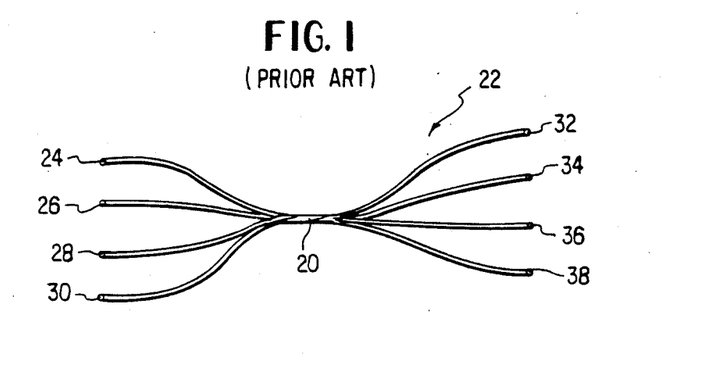
FIG. 1 is a plan view diagrammically illustrating a passive transmissive star.

Fiber optic transmissive stars are passive coupling devices for interconnecting a number of terminal devices in an optical communication network. Depending upon its construction, a star might convey optical signals from a number of terminal devices to a single fiber (an N-to-1 star), from a single fiber to a number of terminal devices (a 1-to-N star), or from and to a number of terminal devices (an M-to-N star). The basic physical structure of a star is illustrated schematically in FIG. 1, wherein four optical fibers have been fused at a tapered region 20 to provide a star 22 having light ports 24, 26, 28, and 30 on one side and light ports 32, 34, 36, and 38 on the other. Light entering star 22 through any of the ports on one side is equally distributed to all of the ports on the other side. For example, light entering port 24 would be conveyed to each of ports 32-38, the light intensity at each of these latter ports being one quarter the intensity of the light originally launched into port 24. Similarly, an optical signal applied to any of ports 32-38 would be conveyed, at reduced intensity, to ports 24-30. Although the example illustrated in FIG. 1 is a 4-to-4 star, in practice stars can have as many as eighty or more pairs of ports. Star 22 could be transformed to a 4-to-1 star by using ports 24-30 to receive optical signals from four terminal devices and using only one port on the other side, for example port 32, to convey light from the star, ports 34, 36, and 38 being terminated in a non-reflecting manner. This same configuration could be used as a 1-to-4 star by conveying optical signals which enter port 32 to the optical receivers in four terminal devices connected to ports 24-30. It will be apparent that 2-to-1 or 1-to-2 access couplers for connecting one optical fiber to another can be fabricated in much the same way.

A number of dispersed stars can be interconnected to form a single network which optically links a number of terminal devices, so that an optical signal from one terminal device propagates to all other terminal devices in the network. In order to permit one terminal device to designate another terminal device as the intended recipient of a message to be transmitted over the network, each terminal device is assigned a unique, identifying address code. The data packet which is transmitted includes an address portion in addition to a message portion in order to permit the addressed terminal device to receive the message portion, which is ignored by the terminal devices which have not been addressed. Sophisticated techniques for generating, detecting, and decoding such data packets have been developed in the electrical communication art and can be readily adapted for use in networks employing optical fibers as the transmission medium.

It frequently happens that more than one terminal device at a time may have a data packet ready for transmission. Since the optical signals would interfere with each other if they were applied to the network simultaneously, a network access control system must be employed to prevent chaos. Several access control systems are available. In the poling system, for example, a central network manager sequentially interrogates the terminal devices in the network by emitting identification codes, and a terminal device with a message to send is permitted to access the network upon receipt of its identification code. Another access control system is called CSMA/CD (carrier sense multiple access with collision detection), frequently referred to as the "contention" or "collision detection" system. In collision detection, each terminal device monitors the network and is permitted to begin transmitting a data packet whenever the network is not already in use. It may happen that two or more terminal devices access the network substantially simultaneously, so that a "collision" occurs. Each terminal device detects the collision and stops transmitting. After a random delay each of the terminal devices is permitted to again seek access to the network.

The "token passing" access control system is similar to the poling system, except that the function of the central network manager is distributed to the terminal devices themselves. Instead of a central network manager which emits a list of terminal device identification codes, the terminal devices themselves emit the codes, or "tokens." In this system a terminal device with access to the network may address any other terminal device and send a message to it, whereupon the terminal device with access "passes the token" to the next terminal device scheduled for access by emitting a code which identifies the next terminal device. The token passing protocol may limit messages to a predetermined length in order to avoid a communication "filibuster" by a terminal device having a long message to send, so that the other terminal devices have an equitable opportunity to access the network at reasonable intervals.

Various token passing schemes are known in the electrical communication art. A typical token passing protocol might provide for a serially transmitted data packet having a clock-synchronizing prefix portion, an address indicator followed by an address portion, a message indicator followed by a message portion, perhaps limited to a predetermined number of bits, and finally a token prefix and the token. The address indicator, address portion, message indicator, and message portion would, of course, be omitted from the data packet if a terminal device merely passes the token along, without sending a message to another terminal device.

Optical signals propagate in fibers at about 200 meters per microsecond, so that the propagation time for a network is about 5 microseconds per kilometer of end-to-end length. It will be apparent that the average time required to gain access to the network, regardless of the network access system employed, increases as the end-to-end propagation time increases. In a collision detection system, for example, the gap between messages must exceed the end-to-end propagation time so that all terminal devices can become aware that a transmission has ended before any terminal device initiates a new transmission. Moreover the duration of the maximum fragment which can be transmitted before a collision is detected and the transmission is aborted is twice the end-to-end propagation time. With a token passing access control system, the token passing period includes the time to propagate the token and process it at the next terminal device on the token list. The time between successive accesses by a terminal device cannot be less, even if no messages are transmitted, than the time to pass the token to all terminal devices on the network. Network size also increases access intervals in a poling network control system.

SUMMARY OF THE INVENTION

Accordingly, the principle object of the present invention is to provide a fiber optic network having improved access time.

Another object of the present invention is to provide a fiber optic network having different subnetworks which are connected by a bus, each subnetwork being subjected to an independent access control system. Since the entire network is not controlled by a single access control system, access delays arising from the physical dimensions of the network are reduced.

Another object of the present invention is to provide a fiber optic network having subnetworks which are connected to a bus that conveys data between the subnetworks on different optical channels. This permits tokens, for example, to be confined within the subnetworks; the tokens are not transmitted over the bus.

These and other objects can be attained by providing a fiber optic network having a bus with a first fiber to convey light in one direction and a second fiber to receive the light from the first fiber and convey it in the opposite direction. Subnetworks are optically connected to the bus, each subnetwork supporting a plurality of terminal devices therein. Each subnetwork is connected to the first fiber of the bus by a transmit repeater and to the second fiber of the bus by a receive repeater. The transmit repeaters of the subnetworks are assigned different optical channels and the receive repeaters receive optical data over the channels of the transmit repeaters of all of the other subnetworks. A receive repeater need not receive on the channel of the transmit repeater within the same subnetwork because the transmit and receive repeaters of a subnetwork are electrically connected. This electrical connection permits a terminal device to send a message to another terminal device within the same subnetwork without utilizing the bus, which is employed only for communication between terminal devices in different subnetworks. By providing a separate transmission channel for each isolated subnetwork, communication between the subnetworks can take place freely without data collisions or the necessity of passing tokens between the subnetworks. Token passing or collision detection can then be essentially localized to the individual subnetworks.

An N-to-1 star is preferably used to connect the optical transmitters of the terminal devices in a subnetwork to the transmit repeater of the subnetwork, and a 1-to-N star is preferably used to connect the receive repeater to the optical receivers of the terminal devices.

The different optical channels employed on the bus may be achieved by wavelength multiplexing, with a different optical wavelength being employed for each channel. Alternately, the channels can be provided by amplitude or frequency modulating light from sources having the same wavelength. This can be accomplished by electrically modulating a carrier signal in the channel band and then using the modulated carrier to control the intensity of a light signal.

In accordance with one aspect of the invention, the influx of data into a subnetwork from the bus is controlled in order to ensure adequate access by the terminal devices within the subnetwork receiving the influx. If the influx were too great, the subnetwork would be overwhelmed and the terminal devices therein would have an inadequate opportunity to send their own data. In order to protect the subnetworks from an uncontrolled influx of data, the rate at which the subnetworks can place data on the bus is limited. This can be accomplished in a token passing system, for example, by delaying passage of the token when messages are sent to terminal devices in other subnetworks. In a collision detection system, a dummy signal can be used to "capture" a subnetwork briefly following the transmission of messages to other subnetworks.

BRIEF DESCRIPTION OF THE DRAWINGS

FIG. 5C is a schematic block diagram illustrating a data receiver employed in the receive repeater of FIG.

4B when amplitude modulated signals are conveyed by the bus;

DESCRIPTION OF THE PREFERRED EMBODIMENTS

Figure 2:
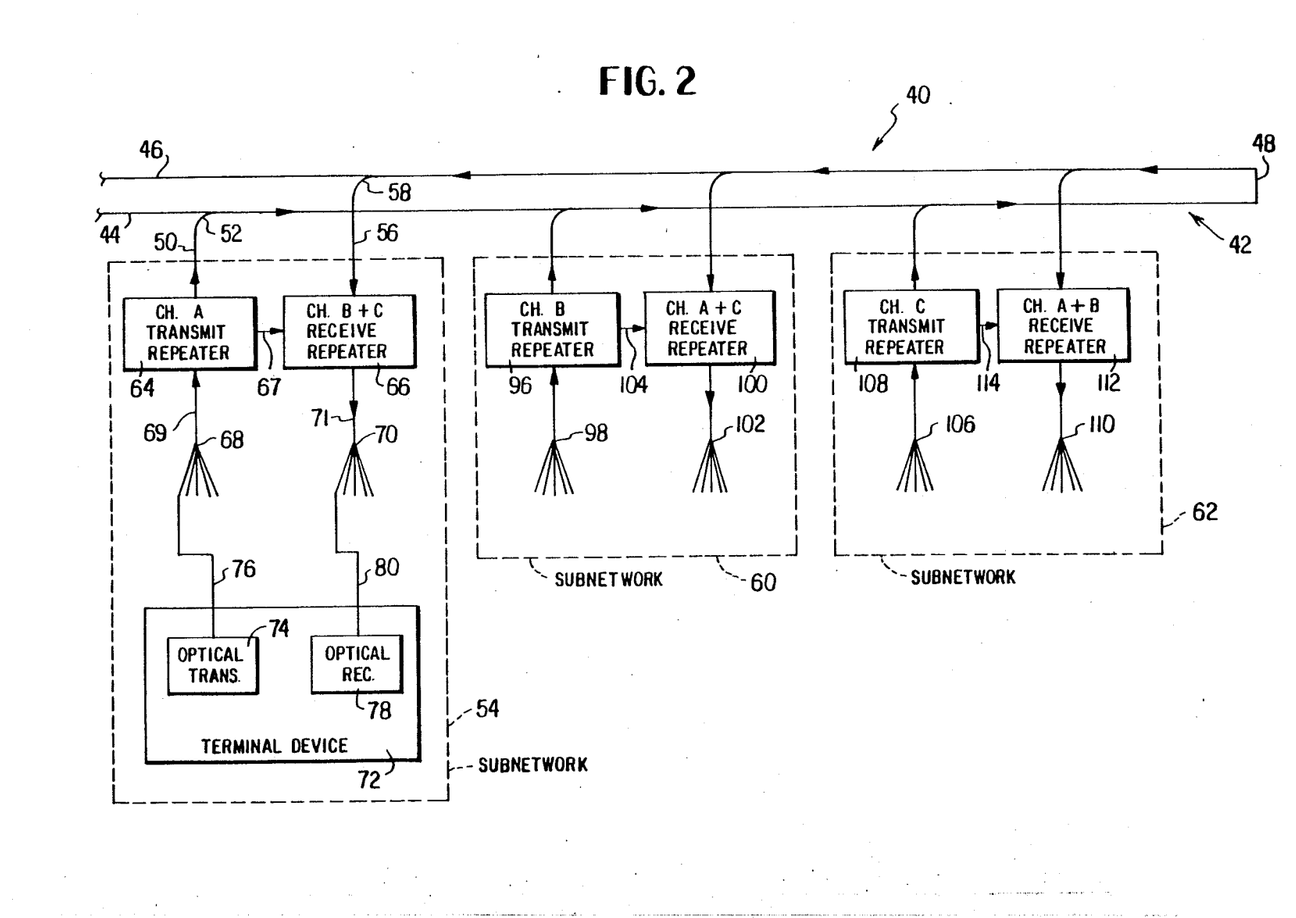
FIG. 2 is a schematic block diagram of the multi-star fiber optic network of the present invention, and illustrates isolated subnetworks which are connected to a bus.

In FIG. 2, fiber optic network 40 includes a bus 42 provided by optical fibers 44 and 46, which are optically connected by fiber 48 so that light traveling through fiber 44 in the direction of the arrows, toward fiber 48, is recirculated and returns through fiber 46 in the direction of the arrows. Optical fiber 50 and access coupler 52 connect subnetwork 54 to fiber 44, and optical fiber 56 and access coupler 58 connect subnetwork 54 to fiber 46. In a similar manner subnetworks 60 and 62 are each connected to fiber 44 and fiber 46 of bus 42. Although only three subnetworks are illustrated in FIG. 2, it will be apparent that additional subnetworks could be connected to bus 42. However, to facilitate the description of the invention it will be assumed hereafter that only the subnetworks 54, 60, and 62 are present.

With continuing reference to FIG. 2, subnetwork 54 includes a channel A transmit repeater 64, having an output connected to fiber 50, and a channels B and C receive repeater 66, having an input connected to fiber 56. Electrical signal path 67 connects repeaters 64 and 66. N-to-1 star 68 is connected by fiber 69 to the input of transmit repeater 64, while 1-to-N star 70 is connected by fiber 71 to the output of receive repeater 66. Terminal device 72 includes an optical transmitter 74, which is connected by optical fiber 76 to an input port of star 68, and an optical receiver 78, which is connected by optical fiber 80 to an output port of star 70. It will be apparent that although stars 68 and 70 are illustrated in FIG. 2 as 5-to-1 and 1-to-5 stars, respectively, in practice N would generally be greater than 5. It will also be apparent that stars 68 and 70 are connected to a plurality of terminal devices, rather than the single terminal device 72 that is illustrated in FIG. 2.

Figure 3A:
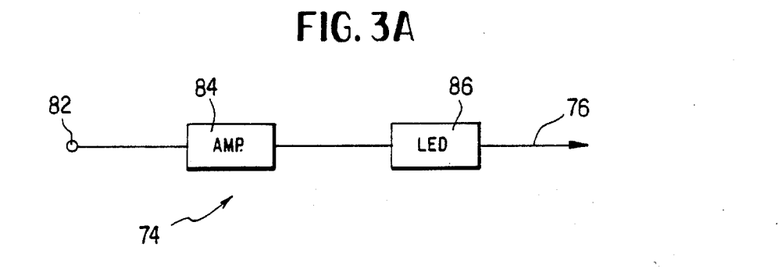
FIGS. 3A and 3B are schematic block diagrams illustrating simplified examples of circuitry for optical transmitters and receivers, respectively, in a terminal device.
Figure 3B:
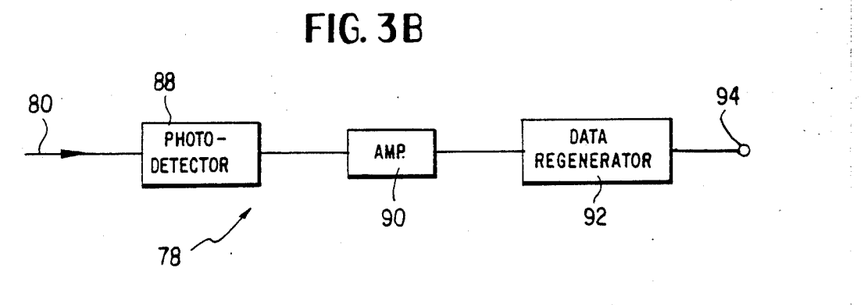

With reference next to FIGS. 2, 3A, and 3B, optical transmitter 74 is present in terminal device 72 to transform electrical signals generated within device 72 into the optical counterparts of these signals. FIG. 3A illustrates a simplified example of how this can be accomplished. In FIG. 3A, an electrical signal in digital form is applied to optical transmitter input terminal 82. The electrical signal is amplified by amplifier 84 and provided to LED 86, which turns ON when the electrical signal is high and OFF when the electrical signal is low. Thus LED 86 produces ON/OFF flashes of light corresponding to the electrical signal at terminal 82. The end of fiber 76 is mounted adjacent the active surface of LED 86 to capture these flashes. Optical receiver 78 performs the counterpart operation, transforming flashes of light back into electrical signals. In FIG. 3B, the end of fiber 80 emits light to photodetector 88. The electrical output of photodetector 88 is amplified by amplifier 90, and the resulting signal is given sharp leading and trailing edges by data regenerator 92, such as a comparator or Schmidt trigger, before being applied to optical receiver output terminal 94. Within terminal device 72 is electrical circuitry (not illustrated), of a type know in the art, to generate and manipulate the digital signals provided to and received from transmitter 74 and receiver 78. Transmitter 74 and receiver 78 can, of course, be more sophisticated than the simple examples illustrated in FIG. 3A and 3B.

Returning to FIG. 2, subnetwork 60 includes a channel B transmit repeater 96 which receives an optical input from N-to-1 star 98 and provides an optical output to fiber 44. Channels A and C receive repeater 100 is connected between fiber 46 and 1-to-N star 102. Repeaters 96 and 100 are electrically connected via electrical signal path 104. In a similar manner subnetwork 62 includes a star 106 which provides optical signals to channel C transmit repeater 108 and a star 110 which receives optical signals from channels A and B receive repeater 112. Repeaters 108 and 112 are optically connected to bus 42 and are electrically connected to each other via electrical signal path 114. Although not illustrated in the drawing, terminal devices such as device 72 are connected to stars 98 and 102 of subnetwork 60 and to stars 106 and 110 of subnetwork 62.

At this point it is appropriate to summarize various features of the transmit and receive repeaters (e.g., 64 and 66), which will be discussed in more detail later. First, the channels A, B, and C represent non-interfering optical channels which can be obtained by wavelength multiplexing, that is, by using different wavelengths for different channels, or by frequency multiplexing. Frequency multiplexed channels can be provided by electrically modulating carriers in the channel bands and then modulating light signals with the modulated carriers. Regardless of how the channels are obtained, their use permits non-interfering communications between subnetworks 54, 60, and 62 to proceed over bus 42 simultaneously. On the other hand bus 42 is not used for communication between terminal devices in the same subnetwork. Instead, the electrical signal path between the transmit repeater and receive repeater (e.g., signal path 67 between transmit repeater 64 and receive repeater 66) is used for this purpose. Furthermore, the receive repeaters (e.g., 66) examine the address portions of incoming messages and disgard messages which are not addressed to terminal devices in the subnetwork of the receive repeater. A receive repeater is also provided with a data buffer to temporarily store incoming messages for later distribution within the subnetwork. These features of network 40 can be further elucidated by several examples. Assume, for example, that terminal device 72 had a message to send to another terminal device (not illustrated) in subnetwork 54. Such a message would be conveyed to transmit repeater 64 by fiber 76, star 68, and fiber 69 and thence via electrical signal path 67 to receive repeater 66. The message would be provided by star 70 to the optical receivers of all of the terminal devices in subnetwork 54, including the terminal device to which the message is addressed. On the other hand if a message from terminal device 72 were addressed to a terminal device (not illustrated) in subnetwork 60, for example, transmit repeater 64 would apply the message, on channel A, to optical fiber 44. The message would subsequently be provided by fiber 46 to each of receive repeater 66, 100, and 112. The message would be ignored by repeater 66, which is not equipped to receive channel A. The message would be received by repeater 112 and disgarded after repeater 112 checks the address portion of the message. Finally, the message would be received by repeater 100 and temporarily stored in the buffer therein prior to delivery to star 102. As will be seen such operation permits a very significant reduction in network access time, since the operation of a network access system such as token passing or collision detection can then be confined to the subnetworks. Propagation delays between subnetworks do not effect access time, which becomes independent of the end-to-end length of bus 42. These advantages will be illustrated with reference to a token passing protocol.

In general, for a network employing token passing the access period $T_{access}$ can be defined as the time between successive receptions of the token at any particular terminal device. The access period is at a maximum when each terminal device within a subnetwork, such as subnetwork 54, transmits a message of the maximum duration permitted under the protocol before passing the token on. Accordingly, it will be apparent that the access period in subnetwork 54, for example, is as follows:

$$T_{access\ max} = N(T_{local} + T_{token} + T_{message}) + T_{buffer} \quad (1)$$

where

- N = number of terminal devices per subnetwork;
- $T_{message}$ = address and message duration (maximum);
- $T_{token}$ = token duration plus processing time before passing the token or initiating a message;
- $T_{local}$ = average propagation time attributable to the subnetwork; and
- $T_{buffer}$ = time to distribute stored messages which have been received from other subnetworks during the token passing cycle.

The access period is a maximum when $T_{buffer}$ is as large as possible, which occurs when subnetwork 54 receives all of the messages transmitted by terminal devices in the other subnetworks. Assuming that there are S subnetworks (rather than the three illustrated in FIG. 2), each transmitting N messages during a token passing cycle, $$T_{buffer\ max} = (S-1)NT_{message} \quad (2)$$

Combining equations 1 and 2, $$T_{access\ max} = N(T_{local} + T_{token} + T_{message}) + \quad (3)$$
$$(S-1)NT_{message} = SNT_{message} + N(T_{local} + T_{token})$$

In order for the access period $T_{access\ max}$ to be assured, the message rate of the S−1 subnetworks (i.e., subnetworks 60 and 62 in this example) that are receiving no messages over bus 42 (since all messages are assumed to be directed to subnetwork 54) must be constrained. Otherwise, the subnetwork receiving all of the messages might be swamped, with incoming messages piling up faster than they can be distributed. That is to say, the token passing cycle of the subnetwork receiving all of the messages might slow to a standstill while the cycles of the remaining subnetworks proceed unimpeded by the demands of incoming messages. Accordingly, an appropriate constraint to impose is that each subnetwork can load only N messages onto bus 42 during each token passing cycle of the subnetwork receiving all of the messages, that is, during the period $T_{access\ max}$. With this constraint, the minimum time segment $T_{bus\ message\ min}$ allotted to each message placed on the bus is $$T_{bus\ message\ min} = T_{access\ max}/N \quad (4)$$

Combining equations 3 and 4, $$T_{bus\ message\ min} = ST_{message} + T_{local} + T_{token} \quad (5)$$

Since the time that is actually required to pass the token and send a message within a subnetwork that is receiving no messages from other subnetworks is $$T_{message} + T_{local} + T_{token},$$

it will be apparent from equation 5 that an extra delay of $(S-1)T_{message}$ must be added following each message transmitted out of a subnetwork on the bus. This extra delay effectively slows the token passing cycle of a subnetwork having terminal devices which send messages to terminal devices in another subnetwork.

The additional $(S-1)T_{message}$ delay can be accomplished simply by delaying the passage of the next token to a terminal device. Since the tokens are distributed through the receive repeater of a subnetwork (e.g., repeater 66 of subnetwork 54) they can be delayed by storing them within the receive repeater for a period of $(S-1)T_{messge}$. It should be noted that this token delay is required only after messages that have been output to bus 42; no delay is required following messages between terminal devices in the same subnetwork. Moreover during the token delay any messages which have been received from other subnetworks and temporarily stored can be distributed.

The $(S-1)T_{message}$ delay following messages leaving a subnetwork is a sufficient condition for maintaining equitable access by terminal devices in the subnetwork that receives the message, but not a necessary condition. The necessary condition is that only one message be sent by a subnetwork to any other subnetwork during a period $T_{bus\ message\ min}$. Thus the token could be delayed not for every outgoing message, but instead only when the preceding message was sent via bus 42 to the same subnetwork in the previous period $T_{bus\ message\ min}$. This more sophisticated approach could significantly improve the average access time within a subnetwork sending messages to other subnetworks, but it would not significantly effect the limit on the maximum access time within a subnetwork receiving messages from other subnetworks.

At this point it is appropriate to compare the maximum access period set forth in equation 3 with the maximum access period in a conventional fiber optic network having a bus provided by optically connected stars which are positioned at different locations, each star serving local terminal devices. In such a conventional network, the token is sequentially passed to all terminal devices in the network in each token passing cycle. The maximum access period occurs when all terminal devices transmit a message after receiving and processing the token. Accordingly, the access period in a conventional network having a total of SN terminal devices is $$T_{access\ conventional} = SN(T_{star} + T_{network} + T_{token} + T_{message}) \quad (6)$$

where $T_{star}$ refers to the average propagation time attributable to the portion of the network between a star and terminal devices directly connected thereto and, depending upon the particular configuration of the conventional network, is generally equivalent to $T_{local}$, and where $T_{network}$ refers to the average propagation time attributable to transmission between the stars of the network. Comparing equation 6 with equation 3, it can be seen that the maximum access period of network 40 is reduced by an amount $$T_{access\ reduction} = SNT_{network} + (S-1)N(T_{star} + T_{token})$$

The first term of this expression results from the fact that all time spent transmitting messages on bus 42 is saved. The second term results from the fact that token passing within the S subnetworks goes on simultaneously, as opposed to completely sequential token passing in a conventional network.

Figure 4A:
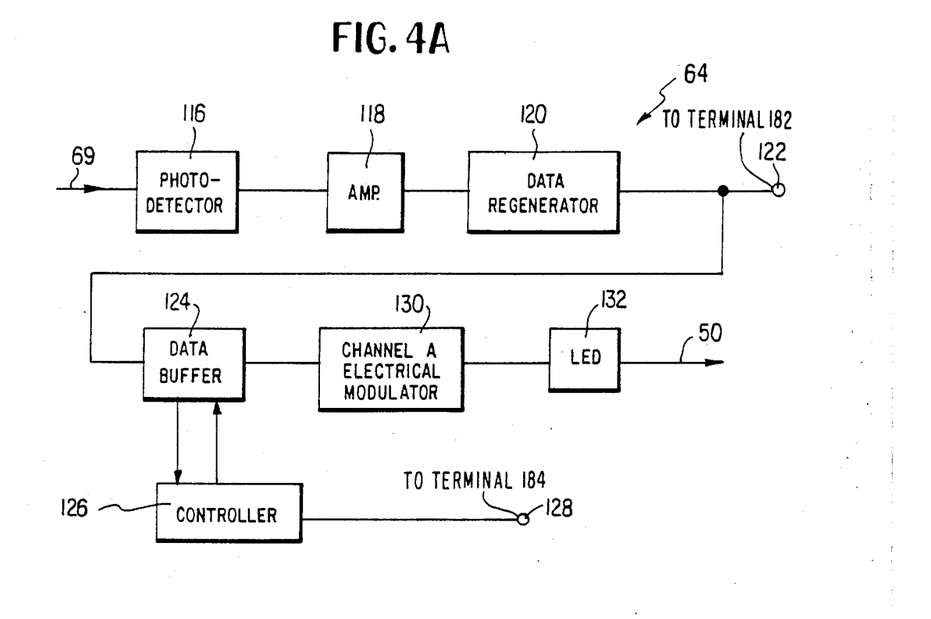
FIG. 4A is a schematic block diagram of a transmit repeater in FIG. 2.

FIG. 4A illustrates an example of a transmit repeater, for example repeater 64, for use in network 40. Optical signals from star 68 exit the end of fiber 69 and impinge upon photodetector 116, such as a photodiode. The resulting electrical signals are amplified by amplifier 118 and provided to data regenerator 120, such as a comparator or Schmidt trigger. Data regenerator 120 imparts sharp leading and trailing edges to the signal, which is provided to baseband output terminal 122. It will be apparent that the signal at terminal 122 is the electrical equivalent of the optical signal provided by fiber 69. The output of data regenerator 120 is also provided to data buffer 124, the operation of which is supervised by controller 126, such as a microprocessor. Controller 126 is connected to outgoing message flag terminal 128. Under appropriate circumstances, which will be discussed, controller 126 reads stored data out of buffer 124. The read-out data are provided to channel A electrical modulator 130 (which will be described momentarily), and then the modulated signal is applied to an optical modulator such as a laser or LED 132. Light from LED 132 enters the end of fiber 50 for transmission to bus 42.

Figure 4B:
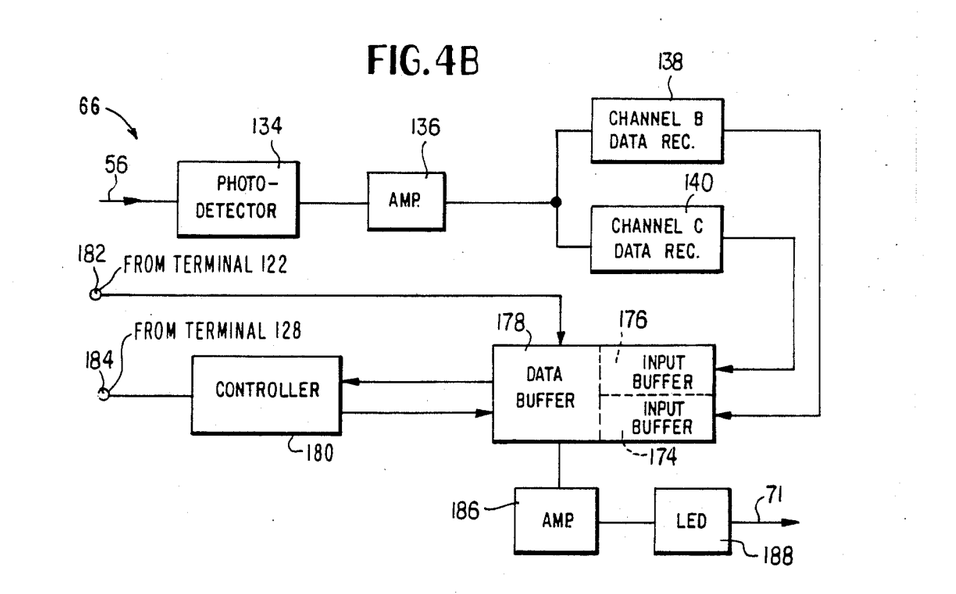
FIG. 4B is a schematic block diagram of a receive repeater in FIG. 2.

FIG. 4B illustrates an example of a receive repeater, such as repeater 66. Light exiting the end of fiber 56 impinges upon photodetector 134, which converts the light to an electrical signal which is amplified by amplifier 136. The amplified signal is provided to both channel B data receiver 138 and channel C data receiver 140. Before proceeding further with the description of receive repeater 66, it is appropriate at this point to pause for a discussion of circuitry suitable for use as channel A electrical modulator 130 (FIG. 4A) and channels B and C data receivers 138 and 140.

Figure 5A:
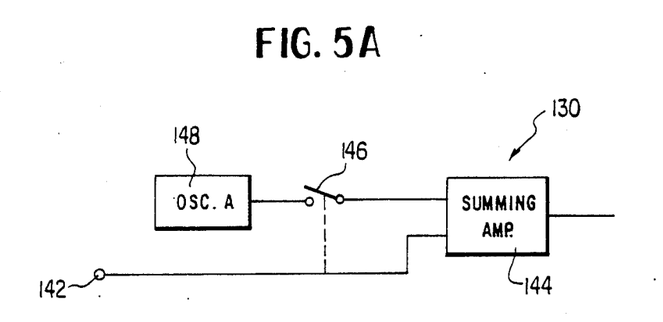
FIG. 5A is a schematic block diagram of an electrical modulator used in the transmit repeater of FIG. 4A when amplitude modulated signals are conveyed by the sub.
Figure 5B:
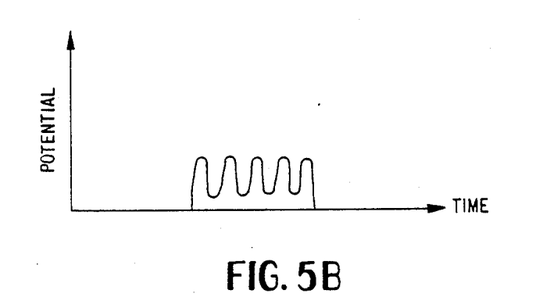
FIG. 5B is a waveform diagram illustrating an example of the electrical signal produced by the modulator of FIG. 5A.

FIG. 5A illustrates an example of channel A electrical modulator 130 where amplitude modulation is employed to obtain the channels. The output of data buffer 124 (FIG. 4A) is applied to electrical input terminal 142. The signal is received by an input of summing amplifier 144 and is also used to control switch 146. Oscillator 148 is connected to another input of summing amplifier 144 through switch 146. Oscillator 148 has a sinusoidal output having frequency A, for example 3 MHz. When an electrical "1" is read-out of data buffer 124 (FIG. 4A), switch 146 is closed and the output of oscillator 148 is provided to an input of amplifier 144. The "1" itself is also applied to an input and serves to bias amplifier 144 so as to avoid a negative output. FIG. 5B illustrates an example of the output of amplifier 144 when a digital "010" is applied to terminal 142. This output is provided to LED 132 (FIG. 4A). For channel B transmit repeater 96 (FIG. 2) oscillator 148 of FIG. 5A would be replaced by an oscillator having the channel B frequency, such as 7 MHz. Similarly, for channel C transmit repeater 108, oscillator 148 of FIG. 5A would be replaced by a channel C oscillator having an output of, for example, 11 MHz.

Figure 5C:
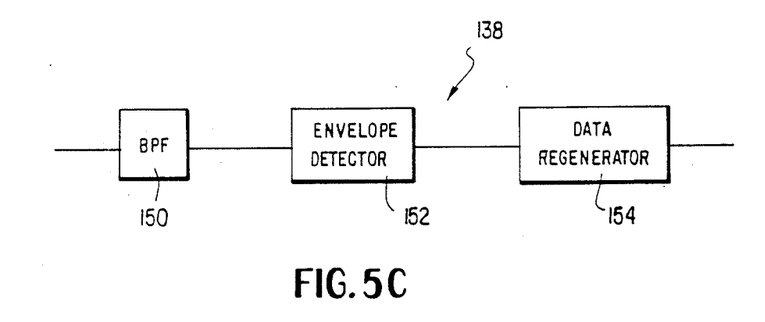

FIG. 5C illustrates an example of channel B data receiver 138 (FIG. 4B) when amplitude modulation is employed to obtain the optical channels. In FIG. 5C, bandpass filter 150 receives signals from amplifier 136 (FIG. 4B). Filter 150 is tuned to pass the B frequency, such as 7 MHz. The output of filter 150 is provided to envelope detector 152 and thence to data regenerator 154, such as a comparator or Schmidt trigger. For channel C data receiver 140, filter 150 would be tuned to the C frequency, and for a channel A data receiver it would be tuned to the A frequency.

With continuing reference to FIGS. 5, it will be apparent that channel A electrical modulator 130 emits signals which would be ignored by channel B data receiver 138, whose bandpass filter 150 is tuned to the B frequency. On the other hand if oscillator 148 were tuned to the B frequency (as in channel B transmit repeater 96 of FIG. 2), the output of data regenerator 154 would correspond to the signal applied to terminal 142. In this way amplitude modulation can be employed to obtain non-interfering optical channels over bus 42 (FIG. 2).

Figure 6A:
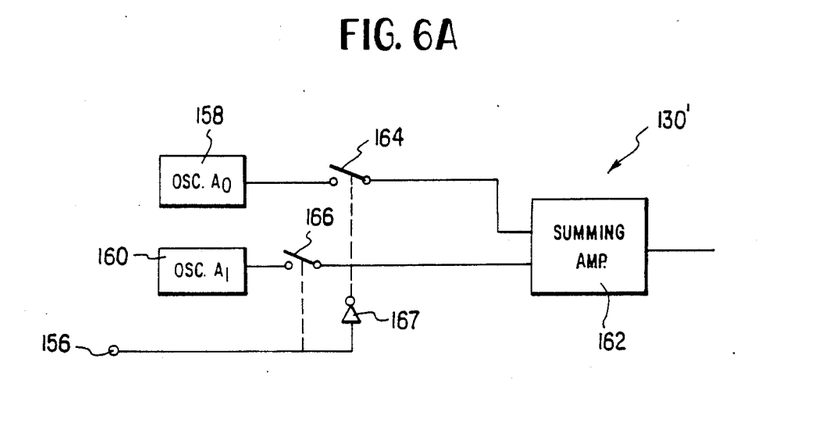
FIG. 6A is a schematic block diagram illustrating an electrical modulator used in the transmit repeater of FIG. 4A when frequency modulated signals are conveyed by the bus.
Figure 6B:
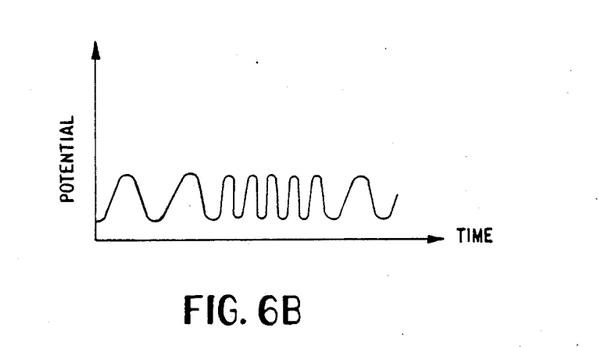
FIG. 6B is a waveform diagram illustrating an example of the electrical signal produced by the modulator of FIG. 6A.

Frequency modulation techniques can also be employed to obtain the optical channels. FIG. 6A illustrates an example of a channel A electrical modulator 130' which could be substituted for electrical modulator 130 (another example, not illustrated, would be a voltage controlled oscillator). In FIG. 6A, electrical terminal 156 receives signals from buffer 124 (FIG. 4A). Oscillators 158 and 160 are connected to inputs of summing amplifier 162 via switches 164 and 166. Oscillator 158 has a frequency $A_0$ and oscillator 160 has a slightly higher frequency $A_1$. When a digital "1" is applied to terminal 156, switch 166 is closed and the $A_1$ frequency is provided to amplifier 162. A digital "0" applied to terminal 156 is inverted by inverter 167 and closes switch 164, thereby providing the $A_0$ frequency to amplifier 162. Amplifier 162 is biased to provide a non-negative output and, moreover, is turned OFF by circuitry not illustrated when data are not being read-out of buffer 124 (FIG. 4A). FIG. 6B illustrates an example of the output of amplifier 162 when "010" is applied to terminal 156. The difference between frequencies $A_0$ and $A_1$ in FIG. 6B is exaggerated for purposes of illustration. For channel B transmit repeater 96 (FIG. 2) oscillators 158 and 160 would be tuned to slightly different frequencies $B_0$ and $B_1$. Similarly, for channel C transmit re108 (FIG. 2) oscillators 158 and 160 would be tuned to slightly different frequencies $C_0$ and $C_1$.

Figure 6C:
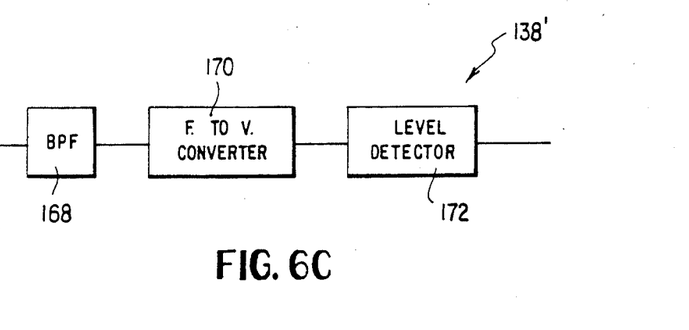
FIG. 6C is a schematic block diagram of a data receiver in the receive repeater of FIG. 4B when frequency modulated signals are conveyed by the bus.

FIG. 6C illustrates an example of a channel B data receiver 138' for use in lieu of receiver 138 when frequency modulation is employed to obtain the channels. The input of bandpass filter 168 is connected to the output of amplifier 136 (FIG. 4B). Bandpass filter 168 is tuned to pass frequencies $B_0$ and $B_1$ and to reject other frequencies. Frequency to voltage converter 170 produces a low voltage when frequency $B_0$ is present and a higher voltage when frequency $B_1$ is present. Level detector 172, such as a comparator, is connected to the output of converter 170 and produces a digital "0" at the lower voltage and a digital "1" at the higher voltage. A channel C data receiver, such as 140 (FIG. 4B), would have a bandpass filter 168 tuned to pass frequencies $C_0$ and $C_1$. Similarly, the bandpass filter 168 of a channel A data receiver would pass frequencies $A_0$ and $A_1$.

Returning to FIG. 4B, the outputs of data receivers 138 and 140 are connected to input buffer portions 174 and 176, respectively, of data buffer 178. Controller 180, such as a microprocessor (and possibly the same microprocessor that is used for controller 126 in FIG. 4A), supervises the operation of data buffer 178 through appropriate status, address, and control conductors. Additionally, baseband input terminal 182 is connected to the input of buffer 178 and flag terminal 184 is connected to controller 180. Terminals 122 and 128 (FIG. 4A) of transmit repeater 64 are electrically connected via electrical signal path 67 (FIG. 2) to terminals 182 and 184, respectively, of receive repeater 66. Under appropriate circumstances, to be described, stored data is read-out from buffer 178 and provided to amplifier 186. The output of amplifier 186 is provided to an optical modulator such as LED 188, which emits optical signals to star 70 via fiber 71 (see FIG. 2).

Figure 7A:
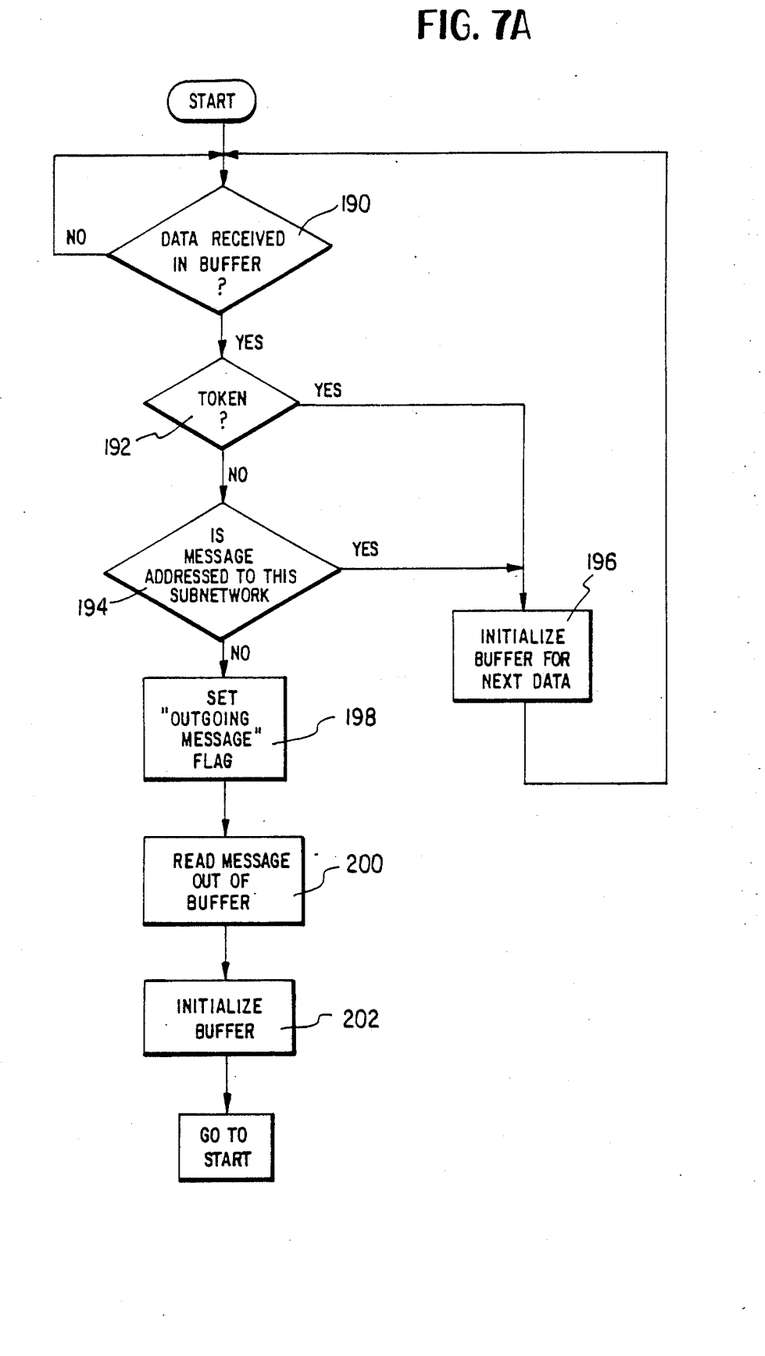
FIG. 7A is a flow chart illustrating the operation of the transmit repeater of FIG. 4A when token passing is employed.

Turning next to both FIGS. 4A and 7A, a program suitable for controlling transmit repeater 64 will now be described with reference to a generalized token passing protocol. Data received from fiber 69 is provided to terminal 182 (FIG. 4B) of receive repeater 66 via baseband output terminal 122 and is also stored, under processor control, in data buffer 124. The data received in buffer 124 may be a message, addressed to a terminal device in subnetwork 54 (FIG. 2) or another subnetwork, or the data may be a token. Controller 126 repeatedly checks whether data has been received in buffer 124, as is indicated by block 190. When data is received a check is made (block 192) to determine whether the data represents a token (yes) or a message (no). If it is a message that is stored, its address is checked (block 194) to determine whether the message is addressed to a terminal device in subnetwork 54 or to a terminal device in one of the other subnetworks. Such address checking is facilitated if all terminal devices in a subnetwork are assigned addresses in a characteristic range, so that only one digit need be checked. For example the terminal devices in subnetwork 54 may have addresses in the range 1000–1999, subnetwork 60 in the range 2000–2999, etc. If the data stored in buffer 124 represents either a token or a message addressed to a terminal device in subnetwork 54, the content of buffer 124 is cleared (block 196) in preparation to receive the next data. On the other hand if the stored data represent a message which is addressed to a terminal device in a subnetwork other than subnetwork 54, a flag is set (block 198) and communicated to receive repeater 66 via outgoing message flag terminal 128. Thereupon the message is read-out of buffer 124 (block 200) and subsequently modulated by modulator 130, converted to an optical signal by LED 132, and delivered to bus 42 by fiber 50. Neither tokens nor messages addressed to other terminal devices in subnetwork 54 are placed on bus 42.

After the outgoing message has been read-out from buffer 124, buffer 124 is cleared (block 202) in preparation for the next data.

Figure 7B:
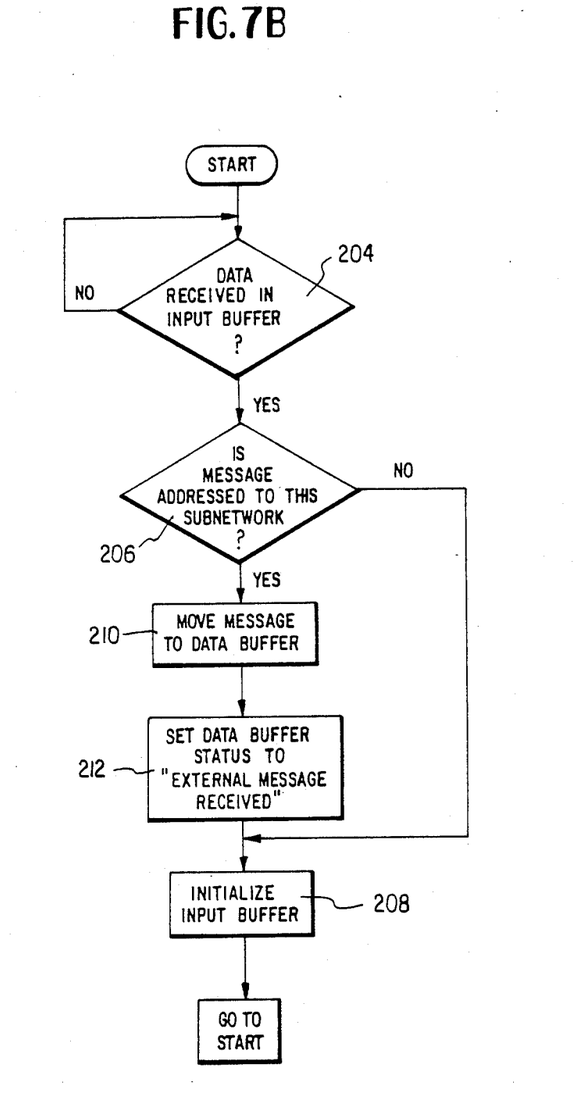
FIGS. 7B and 7C are flow charts illustrating operation of the receive repeater of FIG. 4B when token passing is employed.

With reference next to FIGS. 4B and 7B, the initial processing of a message received via bus 42 by receive repeater 66 will now be discussed. Input buffer portions 174 and 176 are operated under processor control to store incoming messages (as previously discussed, tokens are not communicated via bus 42) from other subnetworks. Buffer portions 174 and 176 are repeatedly checked (block 204) to detect receipt of a message. When a message is received its address is checked (block 206) to determine whether a terminal device in subnetwork 54 is the intended recipient. If not, the message is disgarded (block 208). On the other hand if the address portion of the message identifies a terminal device in subnetwork 54 the message is transferred from the input buffer portion to the main portion of data buffer 178 (block 210). Additionally, the data buffer status is set (block 212) by updating a register (not illustrated) in controller 180 to indicate that an additional external message has been received and stored in data buffer 178 for later distribution to terminal devices in subnetwork 54. After the data buffer status has been set, input buffer portions 174 and 176 are initialized (block 208).

Figure 7C:
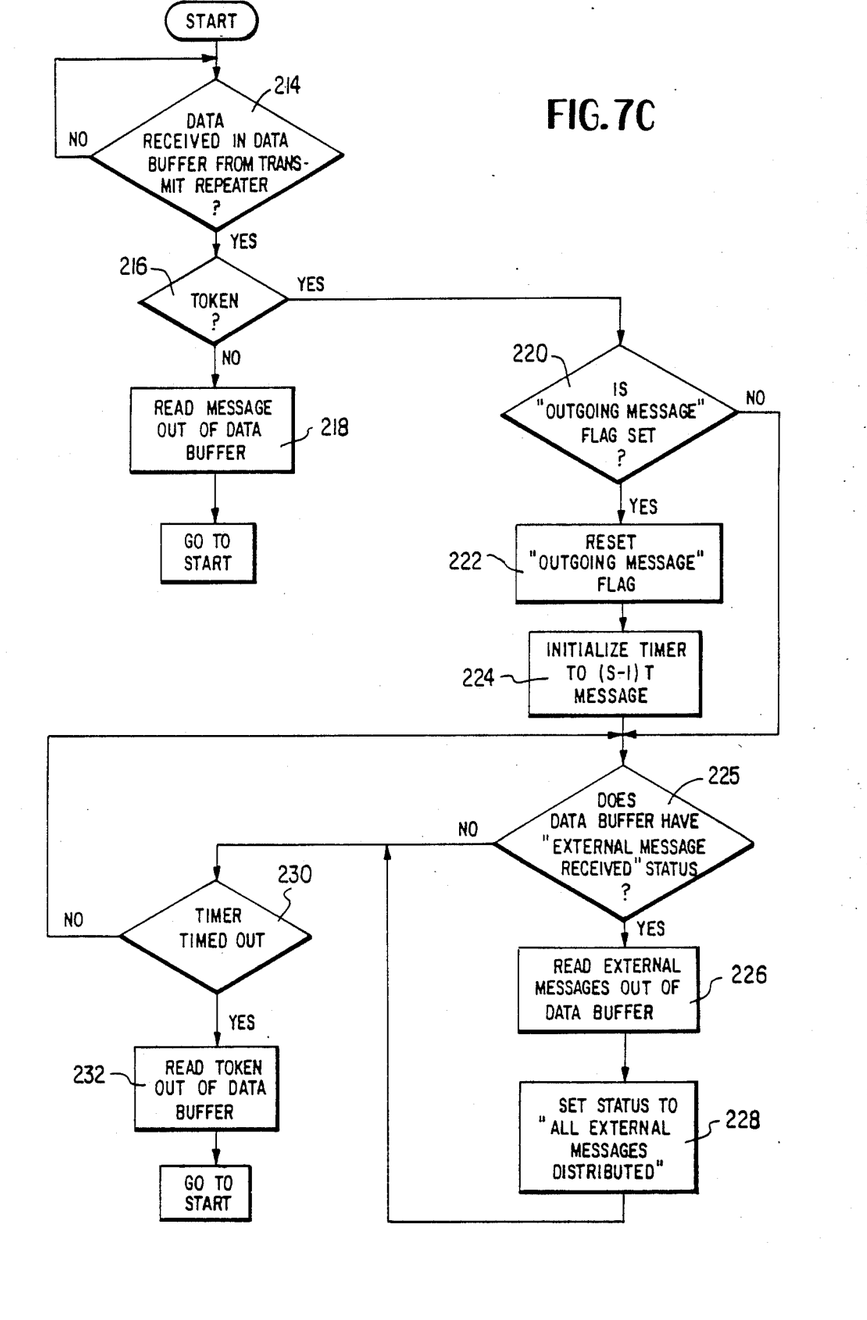

FIG. 7C illustrates a flow chart for controlling the operation of data buffer 178 during receipt of data from transmit repeater 64 and during distribution of data to terminal devices in subnetwork 54. Baseband input terminal 182 receives data from transmit repeater 64, and this data is stored under processor control in data buffer 178. The data may represent a token or a message, addressed to either a terminal device in sub-network 54 or to a terminal device in another subnetwork. Buffer 178 is repeatedly checked (block 214) to determine if data has been received from transmit repeater 64. If so, the data is checked (block 216) to determine whether it represents a token (yes) or a message (no). A message received from transmit repeater 64 is immediately read-out of buffer 178 (block 218) for distribution to the terminal devices in subnetwork 54. The message will of course be ignored by the terminal devices if the message is addressed to a terminal device in another subnetwork. However it will be apparent that the address of the message could be checked before the message is stored in buffer 178 in order to eliminate storage of messages destined for other subnetworks.

With continuing reference to FIGS. 4B and 7C, if it is a token that has been received via baseband input terminal 182, a check is made (block 220) to determine whether the outgoing message flag has been received via terminal 184. If so the outgoing message flag is reset (block 222) and a timer (not illustrated) implemented within controller 180 is initialized to time out after a period of $(S-1)\ T_{message}$ (block 224). On the other hand if the outgoing message flag (block 220) has not been set, the timer content remains at 0. That is to say, upon receipt of a token from transmit repeater 64, the delay period $(S-1)\ T_{message}$ is imposed only if a message has been sent to another subnetwork.

With continuing reference to FIGS. 4B and 7C, messages from other subnetworks that have been stored in buffer 178 are distributed following a token movement in subnetwork 54, regardless of whether the timer has been set or not. In block 225, a check is made to determine whether one or more messages from external sources have been stored in buffer 178. If so they are read-out (block 226) and buffer 178 is initialized to start accumulating subsequent messages from other subnetworks (block 228). After distribution of any messages from other subnetworks, the timer is checked (block 230) to determine whether the token stored in buffer 178 may be read-out (block 232) for passage within subnetwork 54. On the other hand if a delay has been imposed but the timer has not been reduced to 0, the external message receive status is checked again (block 225) so that any additional messages from external sources may be distributed while timer operation continues.

It would be possible to eliminate the address checking step in receive repeater 66 (that is, block 206 in FIG. 7B) by using additional inter-star communication channels. For the three subnetwork system illustrated in FIG. 2, six channels would be needed. Each of receive repeaters 66, 100, and 112 would have two receive channels used by it alone, one for receiving from each of the other subnetworks. Each of transmit repeaters 64, 96, and 108 would transmit on either of two channels, depending upon which subnetwork the message was intended for. Such channels could be obtained by AM or FM frequency multiplexing as previously discussed. Additionally, frequency and wavelength multiplexing could be combined. For example, receive repeaters 66, 100, and 112 could be configured to receive different optical wavelengths, with transmit repeaters 64, 96 and 108 transmitting on different frequency multiplexed channels. The wavelength of the light from each transmit repeater would then be selected according to the destination subnetwork. An advantage of these increased channel arrangements is that the requirement to identify the destination of messages is moved to the transmit repeaters, where only one message is processed at a time.

Although the operation of network 40 has been described with reference to token passing, collision detection may also be employed. Carrier sensing and collision detection would be implemented only within the subnetworks, with no collisions taking place on bus 42 because multiple channels are provided. Buffer overflow in the receive repeaters could be prevented by permitting the receive repeaters to respond more quickly after the mandated interframe (inter-message gap) than competing terminal devices. Outgoing message rates could also be controlled by using the receive repeater to "capture" the subnetwork by generating a dummy carrier for a specified period following message transmission on bus 42.

As the foregoing discussion indicates the present invention provides an optical network having a bus and subnetworks that communicate over the bus via non-inneracting channels. This permits a network access system such as token passing or collision detection to be localized within the individual subnetworks, thereby significantly improving access periods. Moreover a maximum time period to access the network can be assured, this maximum period being independent of the end-to-end length of the bus. Standard token passing or collision detection protocols can be employed within the subnetworks.

It will be understood that the above description of the present invention is susceptible to various modifications, changes, and adaptations, and the same are intended to be comprehended within the meaning and range of equivalents of the appended claims.

What I claim is:

1. A fiber optic network for communication between terminal devices having access periods that are governed by an access control system, comprising:
   an optical bus; and
   a plurality of subnetwork means for optically connecting respective groups of terminal devices to the bus while localizing operation of the access control system to the groups, each subnetwork means including
   star means for receiving optical signals from and distributing optical signals to each terminal device of the respective group,
   a transmit repeater optically connected between said star means and said bus, said transmit repeater having bus transmit means providing a unique optical channel for transmitting messages on said bus, and
   a receive repeater optically connected between said bus and said star means and electrically connected to said transmit repeater, said receive repeater having bus receive means for receiving from said bus messages on the optical channels of transmit repeaters of other subnetwork means connected to said bus, said receive repeater additionally having storage means for temporarily storing messages received from other subnetwork means.

2. The network of claim 1, wherein said bus comprises a first optical fiber to which the transmit repeater of each subnetwork means is optically connected and a second optical fiber to which the receive repeater of each subnetwork means is optically connected.

3. The network of claim 2, wherein said bus further comprises means for optically connecting said first and second fibers so that an optical signal propagating on said first fiber is injected into said second fiber.

4. The network of claim 1, wherein said bus transmit means comprises means for amplitude modulating light and wherein said bus receive means comprises means for detecting amplitude modulated signals.

5. The network of claim 1, wherein said bus transmit means comprises means for frequency modulating light and wherein said bus receive means comprises means for detecting frequency modulated signals.

6. The network of claim 1, wherein said access control system is a token passing system and wherein said transmit repeater comprises means cooperating with said bus transmit means for preventing passage of a token to said bus.

7. The network of claim 1, wherein said access control system is a token passing system and wherein said receive repeater comprises means cooperating with said storage means for delaying passage of a token.

8. The network of claim 1, wherein said access control system is a token passing system, wherein said transmit repeater comprises means cooperating with said bus transmit means for preventing passage of a token to said bus, and wherein said transmit repeater comprises means cooperating with said storage means for delaying passage of a token when messages are transmitted over said bus.

9. The network of claim 8, wherein said means for delaying passage of a token comprises means for selectively delaying passage of a token for a period of time that is proportional to one less than the number of subnetwork means connected to said bus.

10. The network of claim 1, wherein said bus comprises first and second optical fibers and wherein said star means comprises an N-to-1 star and a 1-to-N star, said transmit repeater being connected between said N-to-1 star and said first fiber and said receive repeater being connected between said 1-to-N star and said second fiber.

11. The network of claim 10, wherein said transmit repeater comprises a series connection of a photodetector which receives light from said N-to-1 star, means connected to said photodetector for regenerating a digital signal, and means for storing said digital signal, said means for storing being connected to said bus transmit means.

12. The network of claim 11, wherein said bus transmit means comprises an electrical modulator and an LED, modulated light from said LED being conveyed to said first optical fiber.

13. The network of claim 11, wherein said bus receive means of said receive repeater is responsive to light from said second optical fiber, and wherein said storage means is connected to said bus receive means and to said means connected to said photodetector of said transmit repeater.

14. The network of claim 13, wherein said receive repeater additionally comprises means connected to said storage means for emitting light to said 1-to-N star.

15. The network of claim 11, wherein said means for storing comprises a data buffer which can store a plurality of bits.

* * * * *